Nov. 2, 1937.　　　　R. THOMAS　　　　2,097,706
METHOD OF AND APPARATUS FOR MULTICOLOR PHOTOGRAPHY
Filed Jan. 21, 1935　　　4 Sheets-Sheet 1
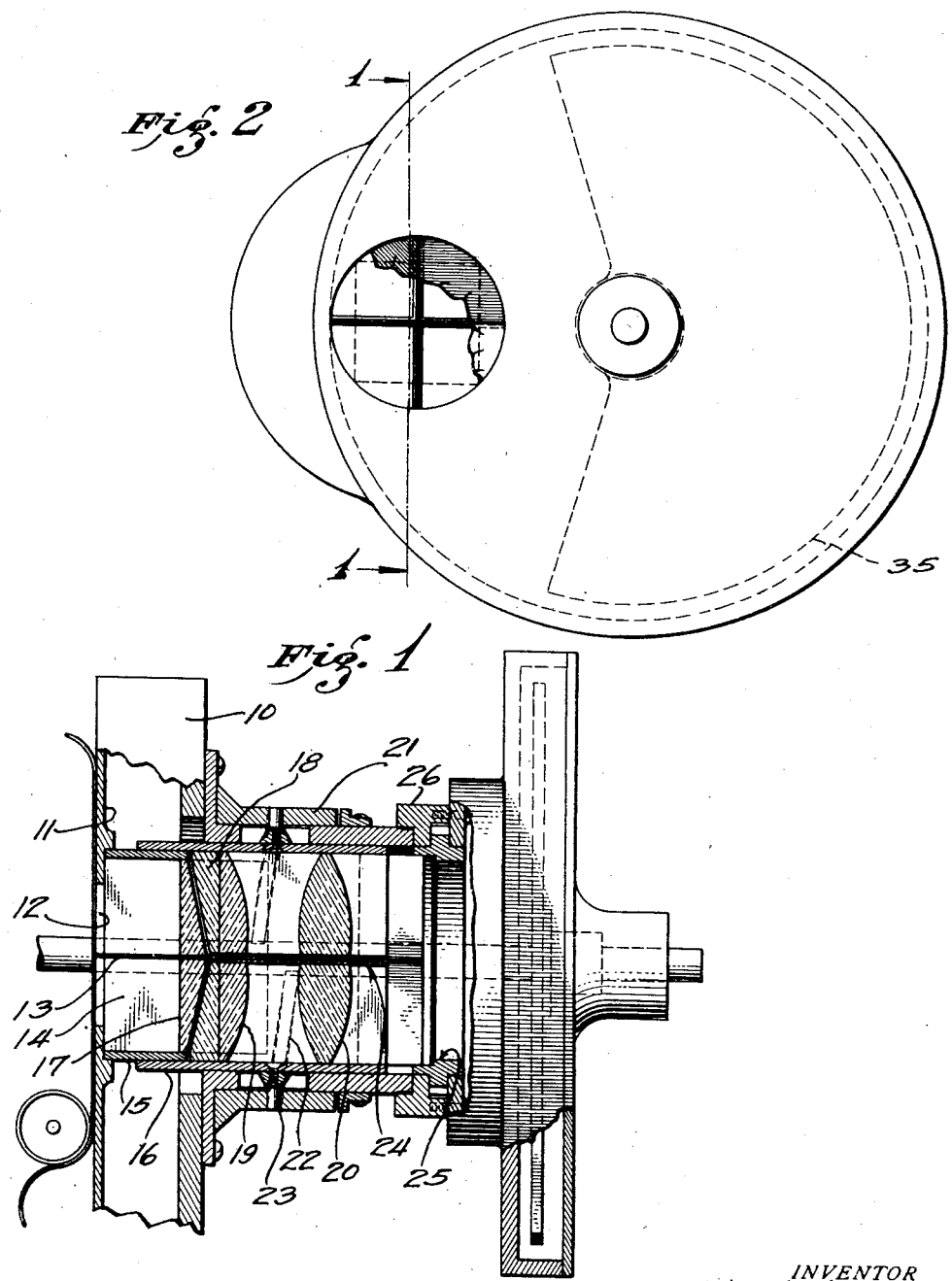
INVENTOR
Richard Thomas
BY
ATTORNEY Nov. 2, 1937.    R. THOMAS    2,097,706
METHOD OF AND APPARATUS FOR MULTICOLOR PHOTOGRAPHY
Filed Jan. 21, 1935    4 Sheets-Sheet 2
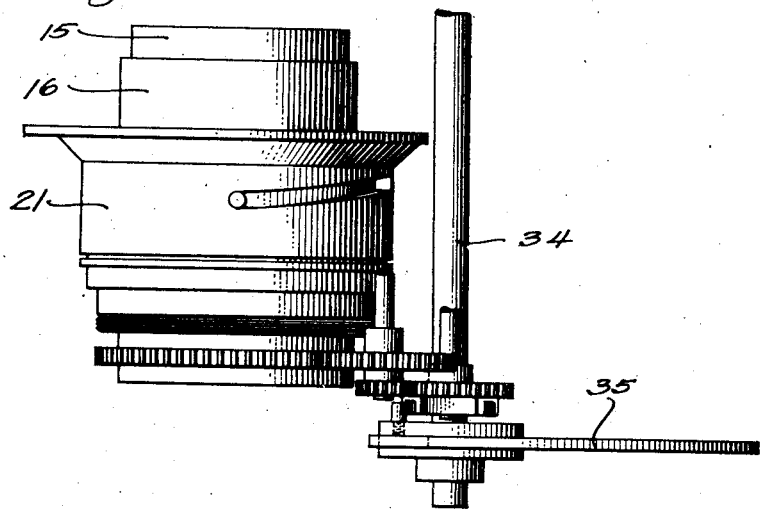
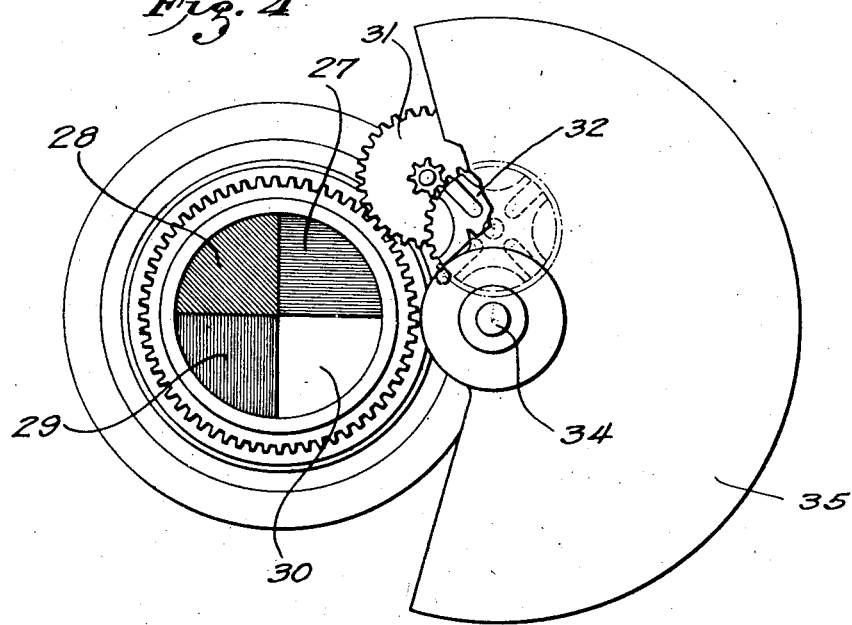
INVENTOR
Richard Thomas
BY
ATTORNEY Nov. 2, 1937.  R. THOMAS  2,097,706
METHOD OF AND APPARATUS FOR MULTICOLOR PHOTOGRAPHY
Filed Jan. 21, 1935  4 Sheets-Sheet 3
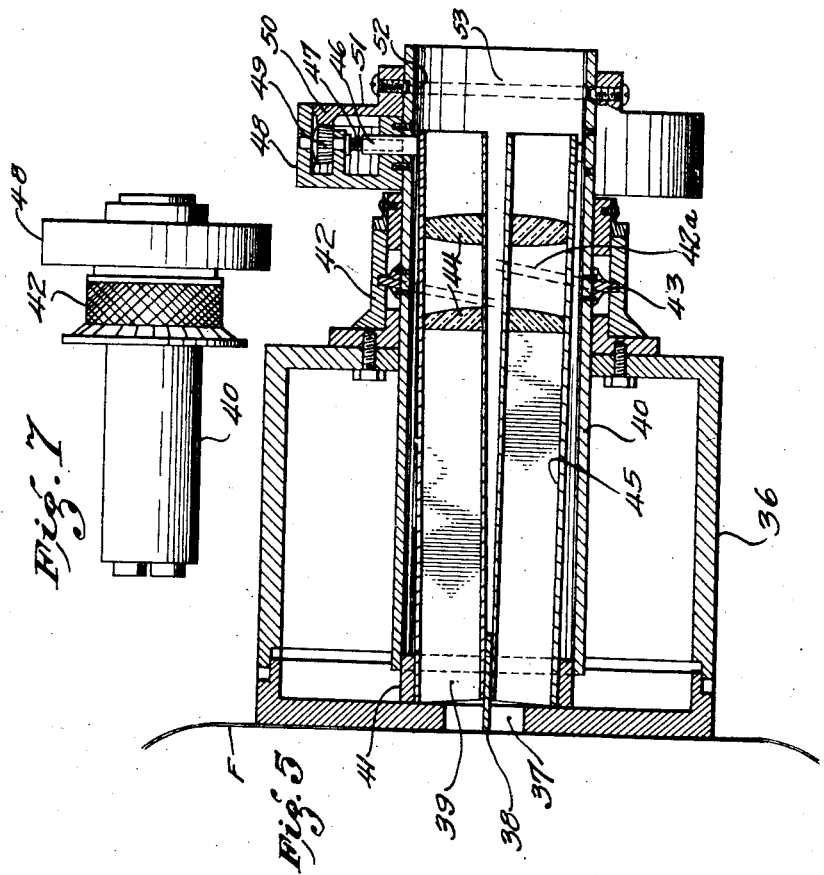
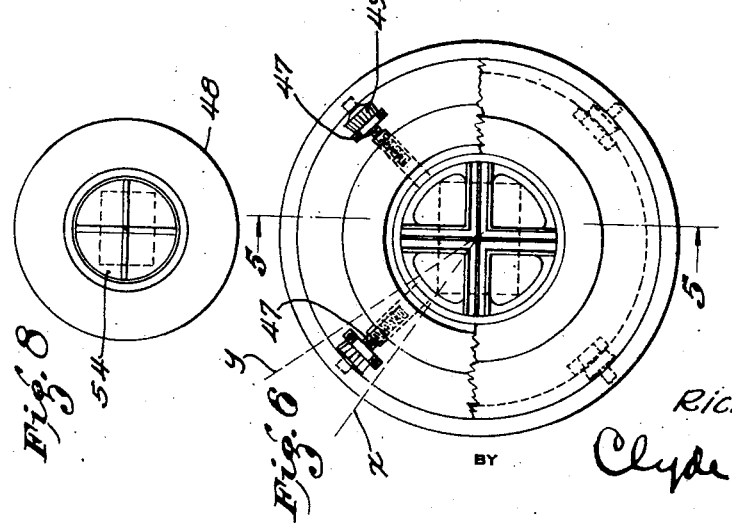
INVENTOR
Richard Thomas
BY Clyde L. Rogers
ATTORNEY Nov. 2, 1937.  R. THOMAS  2,097,706
METHOD OF AND APPARATUS FOR MULTICOLOR PHOTOGRAPHY
Filed Jan. 21, 1935  4 Sheets-Sheet 4

INVENTOR
Richard Thomas
BY Clyde L. Rogers
his ATTORNEY

Patented Nov. 2, 1937

2,097,706

UNITED STATES PATENT OFFICE 2,097,706

METHOD OF AND APPARATUS FOR MULTI-COLOR PHOTOGRAPHY

Richard Thomas, Los Angeles, Calif.

Application January 21, 1935, Serial No. 2,807

7 Claims. (Cl. 88—16.4)

This invention relates to the production of motion picture film adapted for use in additive systems wherein a plurality of image frames are produced on the film with different color values that are adapted to be superimposed to produce a picture in natural colors, and to the projection of motion pictures in color from such film.

In my Patent No. 1,949,339, patented February 27, 1934, I show an improved double lens system adapted to produce motion picture film and to project motion pictures in color therefrom wherein two adjacent image frames of different color values are produced on the film and superimposed one upon the other to produce a motion picture in color.

In my present invention I provide a novel method and apparatus whereby three adjacent images of different color values and embracing the three primary colors of the spectrum are produced upon the film and projected in superimposed relation to produce the projected motion picture accurately and faithfully with respect to color values and registration. In said prior patent the elements of the lens system in the photographic apparatus are so constructed and arranged as to eliminate objectionable parallax in a double lens system and the present invention provides similar means for eliminating parallax in a photographic camera embodying four lens systems. A further object of the present invention is to provide means whereby, with the use of a film strip of double width, i. e., having two picture frames side by side, the entire area of such strip may be utilized for the film images and thus any waste of film avoided. A still further feature of the invention relates to the incorporation in a four lens system, of means for the selective and simultaneous exposure of three color value images, of improved means for eliminating visible parallax and also improved means for focusing and determining closely the separation of the lens systems so that accurate superimposition of the three images, one upon another, is obtained. The means for accomplishing this end is generally similar to that set forth in said Patent No. 1,949,339, but with the special provisions and adaptations required for a four lens, 3-image system instead of the dual image or double lens system of said patent.

The foregoing and other objects and advantages of the invention will be better understood from the following detailed description taken in connection with the accompanying drawings and the distinctive features of novelty will be thereafter pointed out in the appended claims.

Referring to the drawings:

Figure 1 is a view partly in elevation and partly in vertical section showing a photographic camera constructed in accordance with the invention, a major sectional portion thereof being taken on line 1—1 of Figure 2.

Figure 2 is an end view thereof looking from the right in Figure 1.

Figure 3 is a plan view of the interior mechanism of the photographic camera removed and illustrating the operating mechanism.

Figure 4 is an end view of Figure 3, and illustrating more particularly the intermittent movement of the color filters.

Figure 5 is a lengthwise vertical sectional view, with a portion in elevation, this section being taken approximately on the line 5—5 of Figure 6, of a projecting unit constructed in accordance with my invention.

Figure 6 is an end view thereof with portions broken away and looking from the right in Figure 5.

Figure 7 is in elevation showing the lens system unit of the projecting apparatus removed from the housing.

Figure 8 is an end view thereof, these two views being on a somewhat smaller scale than the preceding views.

Figure 9:
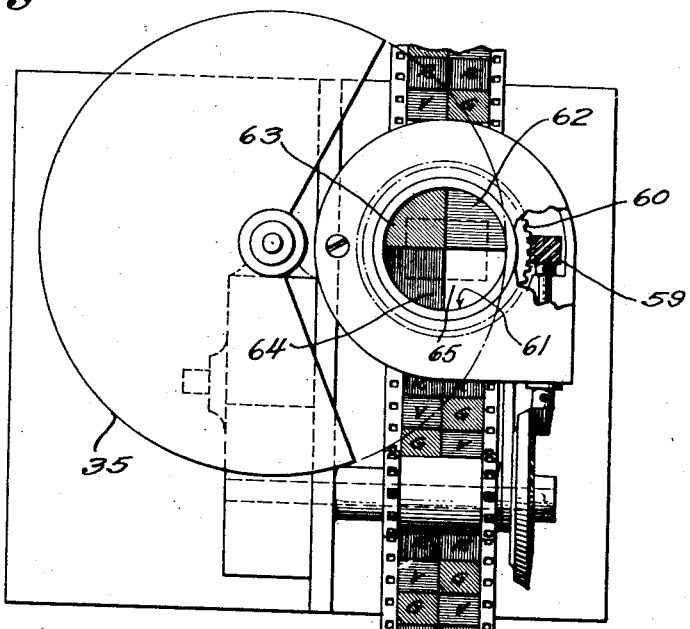
Figure 9 is in elevation with portions broken away in section showing my improved means for operating the color filter system in timed relation with the film movement.
Figure 10:
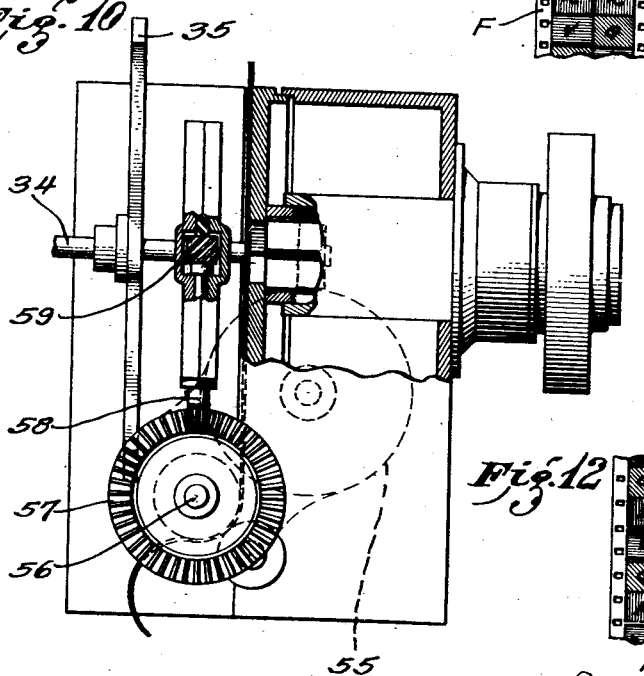
Figure 10 is a view partly in elevation and partly broken away in section of the mechanism of Figure 9 as seen from the right in Figure 9.
Figure 11:
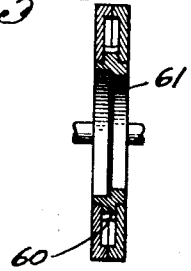
Figure 11 is a sectional detailed view of the color filter holder.
Figure 12:
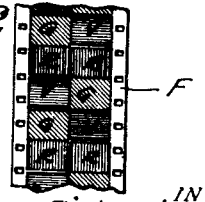
Figure 12 is in elevation showing a portion of the double width film which is preferably used with my invention.

Referring to Figures 1 and 2:

10 indicates a portion of the housing of a motion picture camera having a wall 11 constituting an aperture plate provided with an opening 12 which is divided into four film apertures by a septum arrangement consisting of horizontal and vertical septum devices 13, 14 respectively, which extend diametrically across such opening at right angles to each other. The lens systems of this camera are mounted in a holder which consists of a barrel 15 stationarily mounted in the housing and a second barrel 16 having a telescopic movement endwise with respect to the barrel 15. The space within these barrels is divided into four equal parts by the septum devices 13, 14 and the lens systems in each of these four devices are similar. Each of these lens systems are similar with the elements thereof arranged in the same transverse planes. Each of these lens systems, as shown, comprises a prism element 17, the several prism elements being mounted base to base with the septum devices extending therebetween, these prisms being fixedly mounted in the fixed barrel member 15. The adjustable barrel member 16 has mounted in one end portion thereof and adjacent the prism 17 an arrangement of prism members 18 mounted apex to apex and plano convex lens members 19 adjacent such prisms, these elements being fixed in the barrel member 16 and movable therewith. As shown the barrel member 16 also has mounted therein spaced outward from the lens members 19 double convex lens members 20. The endwise adjustment of the lens holder portion composed of the barrel 16 is effected as shown by an adjusting sleeve 21 mounted to turn on the housing and having cam grooves 22 which are engaged by pins 23 projecting radially outward from the barrel 16. Thus, by turning the adjusting sleeve 21, the movable lens elements 18, 19 and 20 of the four lens systems may be adjusted inward and outward with respect to the fixed prism elements 17 for correct and accurate focusing of the camera. It is to be understood that this adjustment of the movable lens elements with respect to the fixed prism members provides the necessary lens power and maintains correct separation similarly as in my said patent and that these lens systems are so ground and constituted as to eliminate visible parallax similarly as in said patent. The septum devices 13, 14 may each embody a plurality of plates slideable with respect to each other and with outer ones 24 of said plates fixed to and movable with the movable lens elements while the inner plate members of the septum are stationarily held with respect to the housing. It is to be understood that any suitable combination of lenses and prisms of which a number are shown in my prior patent aforesaid may be used in the arrangement described hereinabove, the specific arrangement of prisms and lenses shown in Fig. 1 being simply illustrative of one form which the system may contain.

In accordance with my invention a color filter system is mounted in cooperative relation and for rotary movement with respect to the described lens systems. This filter system is provided with a ring gear 25 mounted to turn in an extension 26 of the camera housing forwardly of the lens systems. This ring gear is provided with an inner rebate in which are mounted three quadrant color filter portions 27, 28, 29, embodying the three primary colors, and a fourth quadrant portion 30 consisting in an opaque plate. The ring gear 25 is engaged for operation by a gear element 31 of a gear train which embodies an intermittent movement shown as of the Geneva type as indicated at 32, which is driven from a disc 33 fixed on a drive shaft 34, and which shaft bears the shutter 35. The Geneva gear 32 and the gear train represented by the gear 31 are so arranged and proportioned that the color filter holder, i. e., the ring gear 25, is turned one-half of a rotation for each rotation of the shaft 34; thus the blank space, i. e., the opaque quadrant 30, will be located alternately on opposite sides of the film, i. e., referring to Figure 4, such space will be located alternately in the lower right-hand quadrant as shown, and in the upper left-hand quadrant which is shown in said figure as, and occupied by, the color screen portion 28. In this way it is possible to utilize the entire area of the film strip without waste, as will be readily understood. The opaque element or quadrant 30 restrains one of the four bundles of light while the remaining three bundles are filtered by the elements 27, 28 and 29 during every other exposure of the film. During intermediate exposures of the film, light through a diagonally related segmental lens is restrained or obstructed by the element 30, the remaining three bundles of light being filtered, triads of images of differing color value being thus recorded on the film in interlocking L relation.

Referring to Figures 5 to 8 of the drawings, these illustrate a projecting unit embodying the principles of my invention as applied to projecting 3-image color pictures.

36 denotes a portion of the housing of a projector apparatus formed in its rear wall with a film opening 37 past which the film F is threaded through a suitable film gate (not shown). This film opening is divided into four quadrant apertures by a horizontal septum structure 38 and a vertical septum structure 39 similarly as already described. 40 denotes a lens housing in the form of a barrel mounted for endwise adjustment with respect to the projector housing 36, the inner portion of the barrel 40 being shown as guided on a sleeve 41 of the projector housing while the forward portion of said barrel is slideably fitted in a forward portion of the housing 36. The lens housing 40 is operated for endwise adjustment by an adjusting sleeve 42 fitted to turn on an extension of the housing 36 and equipped with cam grooves 42a in which operate pins 43 fixed to the barrel 40. In the lens housing 40 are mounted four similar quadrantal lens systems 44, each of these systems being mounted in a holder 45 that embodies portions of both the horizontal septum structure 38 and of the vertical septum structure 39. The inner ends of these lens holders are fitted closely together for endwise adjustment in the sleeve 41, but the outer portions thereof are adjustable radially outward and inward by means now to be described. For this purpose every lens holder 45 is equipped with a threaded socket block 46 fixed near the outer end thereof and engaged with a threaded stem 47, which is journaled to turn in a holder 48 borne by the lens housing 40. Each of these threaded stems 47 has fixed thereto a bevel pinion 49 and all these pinions are engaged by a ring gear 50 formed on a flanged plate 51 which is held therein on the forward end portion of the lens housing 40, said flanged plate having for this purpose screws 52 which engage an annular groove 53 of the lens housing. Thus, by turning the flanged plate 51 the four quadrantal lens systems are moved radially inward and outward with respect to each other to obtain accurate and correct registration of the respective images which are to be superimposed one upon another.

As shown in Figure 6, the several screws 47 which operate to adjust these lens holders are arranged and set centrally or midway of each quadrant holder. This would be the correct setting were the film apertures square, but in practice these apertures are usually somewhat oblong as indicated at 54 in Figure 8 and also, as seen in dotted lines in Figure 6. With such oblong apertures the screws 47, or certain of them, should preferably be mounted somewhat to one side of the center of the respective quadrants, i. e., toward the long side of the film aperture and as indicated by the broken line x, in Figure 6. This is for the purpose of increasing proportionately the degree of lateral adjustment relative to the degree of vertical adjustment, it being understood that in order to superimpose three or four rectangular images into a composite picture, it is necessary to move the images a greater distance in a lateral direction than in a vertical direction, the center to center spacing of the image areas being greater along the horizontal plane than in the vertical plane. With the film apertures oblong in the other direction, the screws 47 should, of course, be correspondingly offset in the other direction as indicated by the broken line y in said Figure 6, the purpose in each case being to effect a symmetrical and proportional adjustment of the respective lens systems with respect to the center of the entire arrangement of the lens systems.

Referring more particularly to Figures 9 to 12, it is requisite that a color screen unit be provided for the projecting apparatus that is operated in the same timed relation as that already described for the photographing camera. For this purpose the shaft 56 of the film reel for the film F, which shaft is driven in usual manner by intermittent gearing 55 from the shaft 34, has fixed thereon a bevel gear 57 which, through a beveled pinion fixed on a shaft 58 drives said shaft. The shaft 58 suitably journaled in a bracket in the housing structure bears at its upper end a spiral gear 59 which meshes with a cooperative gear 60. The spiral gear 60 is in the form of a ring gear mounted in alignment with the film F and has the opening 61 therethrough of a diameter corresponding to the width of the film. This ring gear 60 constitutes a holder for the quadrantal color screens 62, 63, 64, of the primary colors and for an opaque or blank quadrant 65 similarly as already described for the camera color screen. The bevel and spiral gearing described between the shaft 56 and the ring gear 60 which constitutes the screenholder, is so proportioned that the screenholder 60 will turn one-half a rotation at each step movement of the film. Thus the blank space 65 of the screen will alternately occupy the lower right-hand portion as shown in Figure 9 and the upper left-hand portion in said Figure 9, thus making possible the use of the entire film area without waste.

By the described construction utilizing four lens systems for the selective and simultaneous exposure of images of different color value it is thus possible to obtain photographic images with the three primary color values upon the film without wastage of any of the film surface, and to superimpose the three images representing the three primary color values for focusing and projection upon a screen in correct and absolutely accurate registration and so that the color values represented by the three images will be superimposed to produce a picture in color wth absolute fidelity and correctness of detail.

The invention as set forth is adapted for general uses for producing motion pictures in color and it is also of value and important for projecting in color still pictures for transfer to a photo engraving camera by a suitable system of reflective or other image transfer apparatus.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new, and desire to secure by Letters Patent is:

1. A method of multiple simultaneous photography which comprises: forming four equal bundles of light rays from a given objective field; simultaneously focusing said light rays along optical axes which are closely adjacent to one another to virtually eliminate visible parallax; restraining one of said bundles of light and filtering the remaining three bundles to form beams of different color value; exposing a film to said three filtered beams simultaneously to form a triad of images; and restraining a diagonally related bundle of light while filtering the remaining three bundles during every other exposure of the film, whereby triads of images of differing color value are formed in interlocking L relation on the film.

2. In a motion picture apparatus including four closely adjacent lens systems optically related to four separate but adjacent image areas, and means for advancing film intermittently, the combination of: a rotatable holder in operative relation with respect to said lens systems, said holder including three color filters adapted to filter light passing through three of said lens systems and an obturating element adapted to restrain light from one lens system, and means for partially rotating said holder during periods of intermittent motion of the film.

3. In a motion picture apparatus including four closely adjacent lens systems optically directed upon four separate but adjacent image areas, and means for advancing film intermittently, the combination of: means, operated in timed relation to said film advancing means, for selectively restraining light passing through one of two of said lens systems alternately while an exposure is made with light passing through the remaining three lens systems.

4. In a motion picture apparatus including four closely adjacent lens systems optically directed upon four separate but adjacent image areas, and means for advancing film intermittently, the combination of: means, operated in timed relation to said film advancing means, for restraining light passing through one of two diagonally related of said lens systems alternately and for filtering the light passing simultaneously through the remaining three lens systems.

5. In a motion picture camera provided with means for advancing film between periods of exposure, the combination of: four quadrantal lens systems arranged with their optical axes closely adjacent to virtually eliminate visible parallax; means for simultaneously focusing said lens systems; septum means dividing said lens systems one from another; and means operated in timed relation to said film advancing means for restraining light passing through one of two diagonally related of said lens systems alternately and for filtering the light passing through the remaining three lens systems during each period of exposure and while said film advancing means is inoperative, whereby three images of differing color value are obtained on said film, during each period of exposure.

6. In a motion picture apparatus including four closely adjacent lens systems optically directed upon four separate but adjacent image areas, and means for advancing film intermittently, the combination of: means for filtering three light bundles passing through three of said lens systems while restraining the light passing through the fourth, during alternate exposures, and means for restraining one of the previously filtered bundles of light and filtering the remaining three bundles during intermediate exposures.

7. In a motion picture camera provided with means for advancing film between periods of exposure, the combination of: four quadrantal lens systems arranged with their optical axes closely adjacent to virtually eliminate visible parallax; means for simultaneously focusing said lens systems along their optical axes; an aperture plate defining four rectangular apertures in operative relation with said quadrantal lens systems; means, independent of said focusing means, for simultaneously adjusting said lens systems toward and away from each other substantially along radial lines lying in planes passing through diagonals of said rectangular apertures, whereby a differential movement greater along the longer sides of the apertures than along the shorter sides is imparted to said lens systems; a rotatable holder in operative relation with respect to said lens systems, said holder including three approximately complementary color filters adapted to filter light passing through three of said lens systems and an obturating element adapted to restrain light from one lens system, and means for partially rotating said holder between periods of exposure.

RICHARD THOMAS.